United States Patent
Golla et al.

(10) Patent No.: US 10,146,590 B1
(45) Date of Patent: Dec. 4, 2018

(54) AUTOMATICALLY DEPLOYING A VIRTUALIZED OBJECT STORE IN AN OPEN STACK TENANT NAME SPACE

(71) Applicant: EMC IP Holding Company LLC, Hopkinton, MA (US)

(72) Inventors: Hari Golla, Morrisville, NC (US); Eoghan Kelleher, Carrboro, NC (US); Shane Dempsey, Athlone (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 300 days.

(21) Appl. No.: 15/087,067

(22) Filed: Mar. 31, 2016

(51) Int. Cl.
*G06F 9/455* (2018.01)
*G06F 9/50* (2006.01)
*H04L 12/24* (2006.01)
*H04L 29/08* (2006.01)
*G06F 17/30* (2006.01)

(52) U.S. Cl.
CPC ........ *G06F 9/5077* (2013.01); *G06F 9/45533* (2013.01); *G06F 9/5072* (2013.01); *H04L 41/08* (2013.01); *H04L 67/02* (2013.01); *H04L 67/1097* (2013.01); *G06F 17/30* (2013.01)

(58) Field of Classification Search
None
See application file for complete search history.

(56) References Cited

PUBLICATIONS

"Deploying SwiftStack Object Storage for Storage Made Easy", Mar. 2015, SwiftStack.*
Admin, "Object Storage as a Service using Openstack Swift", Oct. 28, 2014.*

\* cited by examiner

*Primary Examiner* — Qing Yuan Wu
(74) *Attorney, Agent, or Firm* — Staniford Tomita LLP

(57) ABSTRACT

An automated framework to deploy a HTTP-accessible backed-up virtualized S3-compliant object store in an OpenStack tenant namespace. The automation framework receives user specified configuration in the form of typed input and provisions and deploys the S3 virtual servers and volumes in the OpenStack project. The S3 servers are configured to provide a load-balanced frontend Proxy and data replication of objects across all virtual S3 storage servers. Once deployed the framework backs up each S3 virtual machine and associated volumes and implements a user-specified backup schedule for the provisioned object store. An S3-compliant HTTP endpoint is configured to allow access using an access key and secret key made visible only within the constraints of the deployment framework.

17 Claims, 3 Drawing Sheets

AUTOMATICALLY DEPLOYING A VIRTUALIZED OBJECT STORE IN AN OPEN STACK TENANT NAME SPACE

TECHNICAL FIELD

Embodiments are generally directed to Embodiments are directed generally to multi-tenant networks, and specifically to an automated framework to deploy a backed-up virtualized object store in an open stack tenant namespace.

BACKGROUND

Shared storage is a key feature in large-scale storage systems that allows multiple different data centers to all access network storage media as if it is local storage, and without the need to duplicate files in their individual computers. A shared storage device typically has multiple ports or means to identify and track multiple sessions in a single port. Cloud computing networks use virtual data centers (vDCs) comprising large numbers of virtual machines (VMs) utilize virtual storage through server virtualization products that allows the system to store virtual machine disk images. Many large-scale networks are utilizing greater amounts of virtual machines (VMs). For example, Software Defined Data Centers (SDDC) are becoming common as enterprises look to cost-effectively increase their resources by converting their physical datacenters to a virtual infrastructure. This virtual infrastructure enables new approach to application development, designed specifically to run in a software-defined data center, where all elements of the infrastructure, from networking, storage, CPU and security are virtualized and delivered as IT (information technology) or infrastructure as a service. Such systems increasingly make use of cloud storage for storing data as objects.

Amazon Simple Storage Service (Amazon S3) has developed as one of the most popular cloud storage standards. It generally provides secure, durable, highly-scalable cloud storage in which a cloud storage provider (e.g., Amazon Web Services) owns and maintains the network-connected hardware and software, while the user simply provisions and uses what they need via a web application. Amazon S3 and other similar systems generally provide easy to use object storage, with a simple web service interface to store and retrieve any amount of data from anywhere on the web.

Cloud computing systems utilizing cloud storage provide shared processing resources and data to computers and other devices on demand and allows for storage and processing of data in third party data centers. OpenStack has developed as a popular open source software platform for cloud computing, and is mostly deployed as an infrastructure-as-a-service (IaaS). It consists of interrelated components that control hardware pools of processing, storage, and networking resources throughout a data center.

Deployment of object stores using present methods remains a manual and labor intensive effort. What is needed, therefore, is an automated framework to deploy a HTTP-accessible backed-up virtualized S3-compliant object store in an OpenStack tenant namespace.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
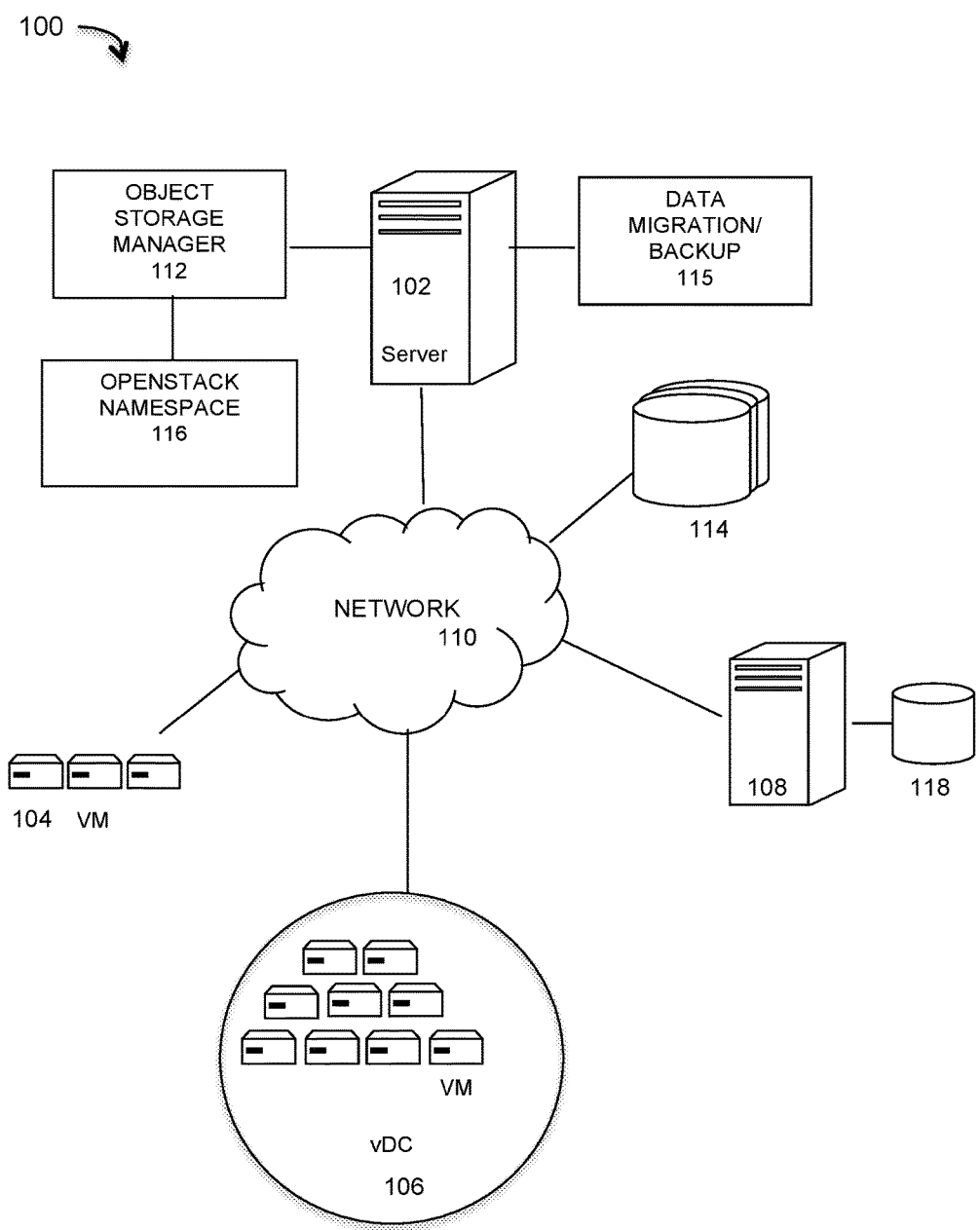
FIG. 1 is a diagram of a virtualized network having an automated framework to deploy a HTTP-accessible backed-up virtualized S3-compliant object store in an OpenStack tenant namespace, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automatic deployment of S3 compliant objects stores in an OpenStack tenant namespace using a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of an automated framework to deploy a HTTP-accessible backed-up virtualized S3-compliant object store in an OpenStack tenant namespace. In system 100, a number of VMs or groups of VMs 104 are provided to serve as backup targets. Target VMs may also be organized into one or more virtual data centers (vDC) 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats (e.g., XML or RDMS). Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP) as in hypertext transport protocols (HTTP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

In an embodiment, system 100 may represent a cloud computing and cloud storage system using object storage techniques. In general, object storage represents a way organizing data by addressing and manipulating discrete units of data called objects. Each object is a stream of user-defined binary data, like a file, however objects are generally not hierarchically organized in folders and are not identified by paths. Each object is associated with a key made of a string when created, and objects are retrieved by using the key to query the object storage. This results in a flat name space organization for objects and prevents familiar data movement operations, such as moving folder containing multiple nested files. This organization eliminates the dependency between objects and allows a great deal of scalability and high availability for storage. The protocol to access object storage is typically the RESTful (representational state transfer) API, which is based on HTTP/HTTPS, and can be used in most network environments.

As shown in FIG. 1, a server computer 102 includes or executes an object storage manager process 112, which utilizes or interfaces to an OpenStack namespace 116. Embodiments are directed to an automated framework to deploy a HTTP-accessible backed-up virtualized S3-compliant object store in an OpenStack tenant namespace. The automation framework receives user specified configuration in the form of typed input and provisions and deploys the S3 virtual servers and volumes in the OpenStack project. The S3 servers are configured to provide a load-balanced front-end proxy and data replication of objects across all virtual S3 storage servers. Once deployed the framework backs up each S3 virtual machine and associated volumes and implements a user-specified backup schedule for the provisioned object store. An S3-compliant HTTP endpoint is configured to allow access using an access key and secret key made visible only within the constraints of the deployment framework.

The object storage manager 112 uses the Amazon S3 object storage protocols to store object data on cloud storage devices, such as VMs 104 or virtual data centers 106. In an embodiment, the S3 system includes a simple web service interface to allo users store and retrieve any amount of data from anywhere on the web, and provisions users with only for the storage that they actually use. Deployment is provided by a third party provider (e.g., Amazon Web Services), and traditionally must be done through dedicated and possible manual processors coordinated by the user (e.g., IT tech personnel or system administrator) and the third party provider, Amazon S3 is an example of an online file storage web service and provides storage through web services interfaces (e.g., REST, SOAP, and BitTorrent). It manages data with an object storage architecture. It is generally configured to stores arbitrary objects (computer files) up to five terabytes in size, each accompanied by up to two kilobytes of metadata, under present supported configuration standards, though other configurations are also possible. Objects are organized into buckets, and identified within each bucket by a unique, user-assigned key. Buckets and objects can be created, listed, and retrieved using either a REST-style, HTTP interface, or a SOAP interface. Additionally, objects can be downloaded using the HTTP GET interface and the BitTorrent protocol. Requests are authorized using an access control list associated with each bucket and object. Bucket names and keys are chosen so that objects are addressable using HTTP URLs. For example:

http://s3.amazonaws.com/bucket/key
http://bucket.s3.amazonaws.com/key
http://bucket/key (where bucket is a DNS CNAME record pointing to bucket.s3.amazonaws.com)

The OpenStack namespace 116 is based on OpenStack, which is a cloud computing platform that consists of interrelated components that control hardware pools of processing, storage, and networking resources throughout a data center, such as vDC 106. Users can manage it either through a web-based dashboard, through command-line tools, or through a RESTful API. Object storage based on virtualized S3-compliant objects may be based on OpenStack Object Storage (Swift), which is a scalable redundant storage system. Objects and files are written to multiple disk drives spread throughout servers in the data center, with the OpenStack software responsible for ensuring data replication and integrity across the cluster. Storage clusters scale horizontally simply by adding new servers. Should a server or hard drive fail, OpenStack replicates its content from other active nodes to new locations in the cluster. Because OpenStack uses software logic to ensure data replication and distribution across different devices, inexpensive commodity hard drives and servers, such as RAID arrays 114 can be used.

In an embodiment, an automated framework to deploy a HTTP-accessible backed-up virtualized S3-compliant object store in an Open Stack tenant namespace. In OpenStack, a namespace is a way of scoping a particular set of identifiers. Using a namespace, a user can use the same identifier multiple times in different namespaces, and can also restrict an identifier set visible to particular processes. In a network namespace, the scoped identifiers are network devices. The system may start up with a default network namespace initially contains all the network devices will be located, though it is generally possible to create further non-default namespaces, and create new devices in those namespaces, or to move an existing device from one namespace to another. Each network namespace has its own routing table. A routing table is keyed by destination IP address, so network namespaces is needed to have the same destination IP address to mean different things at different times. OpenStack Networking requires this feature to provide overlapping IP addresses in different virtual networks. Each network namespace also has its own set of iptables (for both IPv4 and IPv6). So, one can apply different security to flows with the same IP addressing in different namespaces, as well as different routing.

Figure 2:
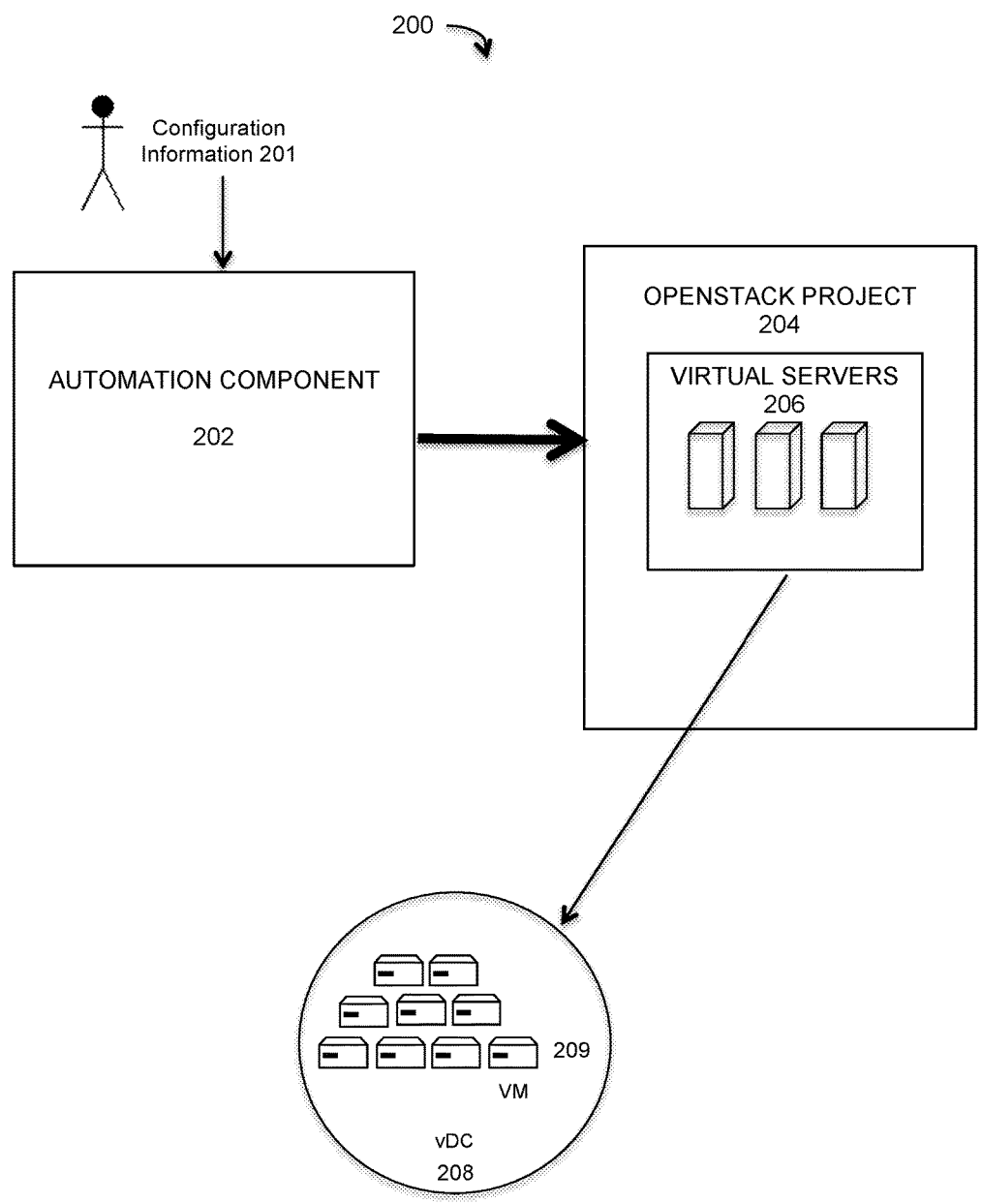
FIG. 2 illustrates functional components of an automated framework to deploy a HTTP-accessible backed-up virtualized S3-compliant object store in an OpenStack tenant namespace under some embodiments.

FIG. 2 illustrates functional components of such an automated frame work under some embodiments. As shown in diagram 200, an automation component 202 receives user specified configuration in the form of typed input. The configuration information includes relevant network and storage information such as source and destination addresses, data blocks, and other such information. The automation component 202 provisions and deploys the S3 virtual servers and volumes 206 in the OpenStack project 204. The S3 servers 206 are configured to provide a load-balanced front-end proxy and data replication of objects across all virtual S3 storage servers, such as in virtual data center 208. Once deployed the framework backs up each S3 virtual machine 209 and associated volumes and implements a user-specified backup schedule for the provisioned object store.

In an embodiment, when the backup process (e.g., process 115 of FIG. 1) backs up the S3 store, it only backs up the associated volumes. If any of the virtual machines are lost it rebuilds the machines with configuration that is saved to a VM that is configured or referred to as an installer VM. Based on the configuration information that is stored in the installer VM, the system is able to rebuild any of the S3 virtual machines and rejoin them to the S3 cluster of the S3 store.

With respect to data backup operations, system 200 can include or be used within or in conjunction with a network backup process. Such a backup system may be a deduplication storage system in which a server (e.g., server 102 in FIG. 1) represents a data backup/recovery server that executes a data migration/backup process 115. Such a process migrates data through backup and/or recovery processes between storage media maintained in one or more data centers. For this embodiment, system 100 may represent part of a Data Domain Restorer (DDR)-based deduplication storage system, and storage server 102 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery.

In an embodiment of system 200, an S3-compliant http endpoint is configured to allow access using an access key and secret key made visible only within the constraints of the deployment framework.

Figure 3:
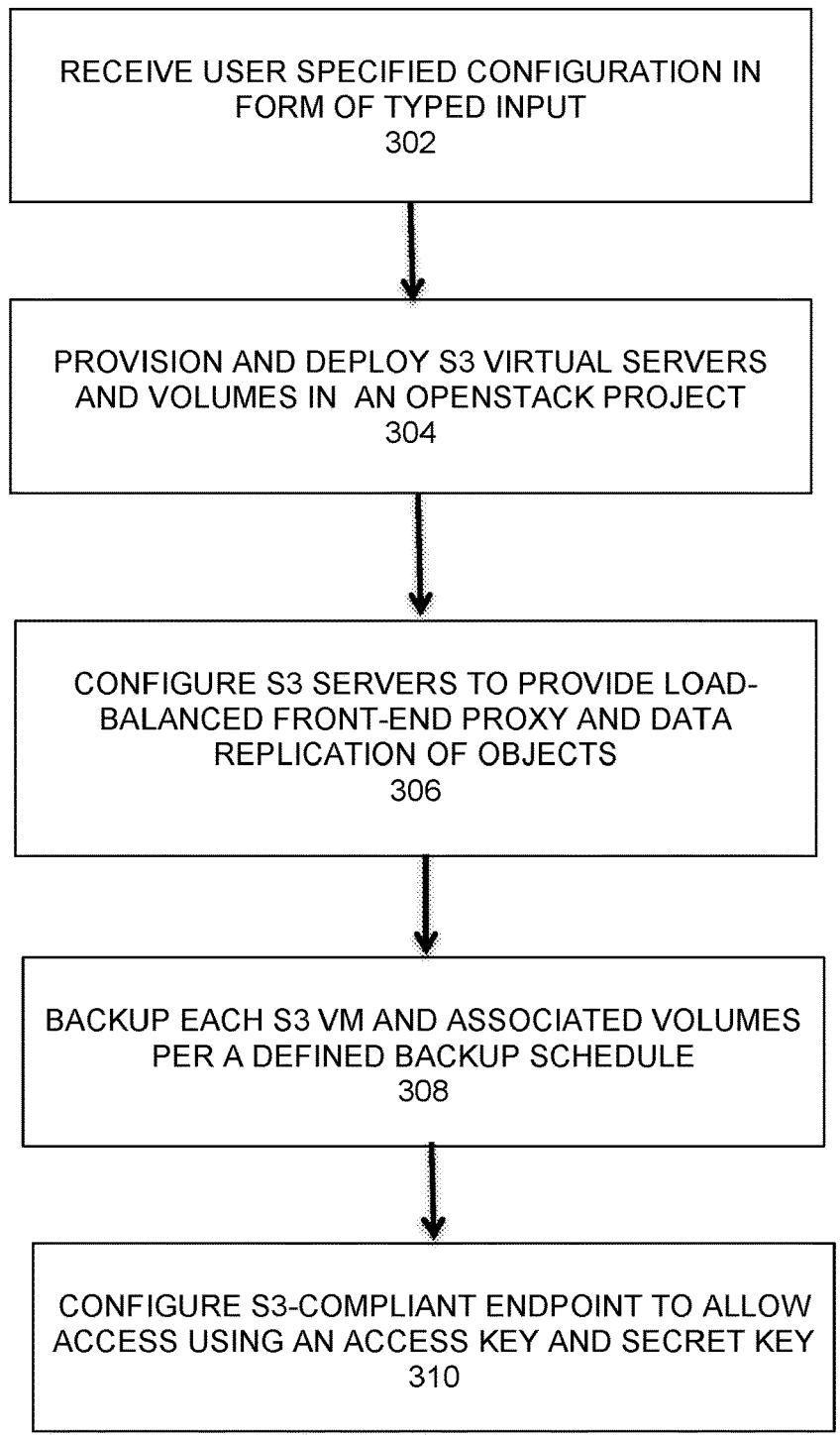
FIG. 3 illustrates a process of providing an automated framework to deploy a HTTP-accessible backed-up virtualized S3-compliant object store in an OpenStack tenant namespace under some embodiments.

FIG. 3 illustrates a process of providing an automated framework to deploy a HTTP-accessible backed-up virtualized S3-compliant object store in an OpenStack tenant namespace under some embodiments. The process of FIG. 3 begins with the automation framework receiving a user specified configuration in the form of typed input, block 302. It then provisions and deploys the S3 virtual servers and volumes in an OpenStack project, block 304. Such a project may be part of the OpenStack Project structure, which is a global collaboration of developers and cloud computing technologists producing the open standard cloud computing platform, or it may be a different project structure.

In block 306 of FIG. 3, the S3 servers are configured to provide a load-balanced front-end proxy and data replication of objects across all virtual S3 storage servers. Once deployed the framework backs up each S3 virtual machine and associated volumes and implements a defined backup schedule for the provisioned object store, block 308. In an embodiment, the backup schedule may be user defined. Alternatively, it may be defined by a default OS setting or data backup scheduler, or other hardcoded parameter. In block 310, an S3-compliant http endpoint is configured to allow access using an access key and secret key made visible only within the constraints of the deployment framework. In an embodiment, the access key and secret key are generated and processed in compliance with the Amazon S3 standards. In general, to use the web interface to access the object data, a user ID and password unique to each user is required. In an embodiment, an AWS (Amazon Web Services) access key and secret key pair serve as the ID and password to access the S3-compliant objects. A user must have an account (e.g., in Amazon S3), which upon activation can be accessed using the ID and password credentials. The access key may be a user name or similar identifier. It is an alphanumeric text string that uniquely identifies the user who owns the account. No two accounts can have the same access key. The secret key comprises or plays the role of a password. It is a secret key because it is assumed to be known by the owner only. A password with access key forms a secure information set that confirms the user's identity to system.

In general, for block 310, an endpoint is a service (e.g., daemon) that a client communicates with to access an API. In OpenStack, API endpoints can provide services such as authentication, adding images, booting virtual machines, and attaching volumes. An endpoint is thus a URL where the user sends requests to manage the data objects, and each service generally has its own endpoint.

Associated with method of FIG. 3 is an associated or additional method of backing up only associated volumes of the S3 virtual servers; saving configuration information for the associated volumes in an installer virtual machine; if any virtual machines for the associated volumes are lost, rebuilding lost virtual machines using the saved configuration information; and rejoining the rebuilt virtual machines to an S3 cluster of the S3 virtual servers.

The automation component 202 of FIG. 2 and the process of FIG. 3 generally provide the advantage of automating deployment of certain S3 and OpenStack processes that traditionally require manual input, procedures, and configurations. They help to greatly speed up and facilitate processes that require a great deal of IT resources and time. They also help to prevent setup issues by automating manual input procedures, which may be prone to errors.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein.

Aspects of the methods, processes, and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Method and process steps may be executed by server or client side components that are processor-based components, programmed digital circuits, programmed arrays, and so on. Method steps may also be embodied as executable program code executed in a processor based system, such as a server computer or client computer coupled in a network. The terms, "component," "module," "procedure," "unit," and "engine" may all refer to a circuit that executes program code to perform a function implemented in software. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for automatically deploying a HTTP-accessible backed-up virtualized S3-compliant object store in an OpenStack tenant namespace, comprising:
    receiving a user specified configuration;
    deploying S3 virtual servers and volumes in a project using an object store of the OpenStack tenant namespace;
    configuring the S3 virtual servers to provide a load-balanced front-end proxy and data replication of objects across all S3 virtual servers;
    after deploying, backing up each S3 virtual server and associated volumes of the deployed volumes in accordance with a defined backup schedule for the object store; and
    configuring an S3-compliant Hypertext Transfer Protocol (HTTP) endpoint to allow access using an access key and secret key made visible only within the constraints of a deployment framework, wherein the HTTP endpoint comprises a service for client communication using HTTP.

2. The method of claim 1 further comprising:
    backing up only associated volumes of the S3 virtual servers;
    saving configuration information for the associated volumes in an installer virtual machine;
    if any virtual machines for the associated volumes are lost, rebuilding lost virtual machines using the saved configuration information; and
    rejoining the rebuilt virtual machines to an S3 cluster of the S3 virtual servers.

3. The method of claim 2 wherein the project comprises an OpenStack Project structure being part of a global collaboration of cloud computing developers producing OpenStack as part of an open standard cloud computing platform.

4. The method of claim 1 wherein the defined backup schedule is one of: a user-defined backup schedule, a system defined backup schedule, and a hardcoded parameter.

5. The method of claim 1 wherein the access key and secretkey are generated and processed in compliance with S3 standards.

6. The method of claim 5 wherein the access key is a user name or similar identifier comprising an alphanumeric text string that uniquely identifies the user who owns the account; and the secret key comprises a password known only to the user.

7. The method of claim 1 wherein the endpoint comprises a service through which a client communicates an application programming interface (API) to provide services including authentication, adding images, booting virtual machines, and attaching volumes.

8. The method of claim 7 wherein the endpoint comprises a uniform resource locator (URL) where a user sends requests to manage the data objects.

9. A system, including a processor executing program code, configured to automatically deploy a HTTP-accessible backed-up virtualized S3-compliant object store in an OpenStack tenant namespace, comprising:
    a user interface receiving a user specified configuration;
    a first automated processor-based hardware component deploying S3 virtual servers and volumes in a project using an object store of the OpenStack tenant namespace, and configuring the S3 virtual servers to provide a load-balanced front-end proxy and data replication of objects across all S3 virtual servers in a network; and
    a second automated processor-based hardware component backing up, after deployment, each S3 virtual server and associated volumes of the deployed volumes in accordance with a defined backup schedule for the object store, and configuring an S3-compliant Hypertext Transfer Protocol (HTTP) endpoint to allow access using an access key and secret key made visible only within the constraints of a deployment framework, wherein the HTTP endpoint comprises a service for client communication using HTTP.

10. The system of claim 9 further comprising the second automated component backs up only associated volumes of the S3 virtual servers, and an installer virtual machine saving configuration information for the associated volumes in an installer virtual machine, wherein if any virtual machines for the associated volumes are lost, the second automated component rebuilds lost virtual machines using the saved configuration information, and rejoins the rebuilt virtual machines to an S3 cluster of the S3 virtual servers.

11. The system of claim 10 wherein the project comprises an OpenStack Project structure being part of a global collaboration of cloud computing developers producing OpenStack as part of an open standard cloud computing platform.

12. The system of claim 9 wherein the defined backup schedule is one of: a user-defined backup schedule, a system defined backup schedule, and a hardcoded parameter.

13. The system of claim 9 wherein the access key and secret key are generated and processed in compliance with S3 standards.

14. The system of claim 13 wherein the access key is a user name or similar identifier comprising an alphanumeric text string that uniquely identifies the user who owns the account; and the secret key comprises a password known only to the user.

15. The system of claim 9 wherein the endpoint comprises a service through which a client communicates an application programming interface (API) to provide services including authentication, adding images, booting virtual machines, and attaching volumes.

16. The system of claim 15 wherein the endpoint comprises a uniform resource locator (URL) where a user sends requests to manage the data objects.

17. A computer program product, comprising a non-transitory computer-readable medium having a computer-readable program code embodied therein, the computer-readable program code adapted to be executed by one or more processors to automatically deploy a HTTP-accessible backed-up virtualized S3-compliant object store in an OpenStack tenant namespace by executing instructions implementing a method comprising:
    receiving a user specified configuration;
    deploying S3 virtual servers and volumes in a project using an object store of the OpenStack tenant namespace;
    configuring the S3 virtual servers to provide a load-balanced front-end proxy and data replication of objects across all S3 virtual servers;
    after deploying, backing up each S3 virtual server and associated volumes of the deployed volumes in accordance with a defined backup schedule for the object store; and
    configuring an S3-compliant Hypertext Transfer Protocol (HTTP) endpoint to allow access using an access key and secret key made visible only within the constraints of a deployment framework, wherein the HTTP endpoint comprises a service for client communication using HTTP.

\* \* \* \* \*